May 4, 1943.  T. G. BOMAN  2,317,976
IRONING CORD HOLDER
Filed Dec. 18, 1941  2 Sheets-Sheet 1
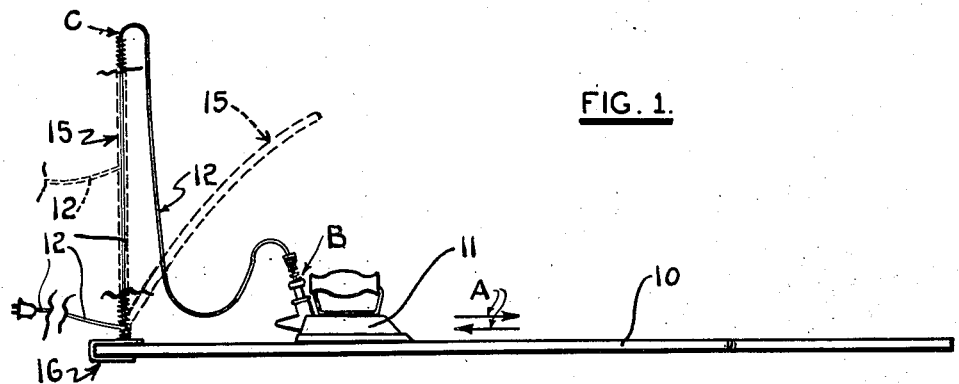
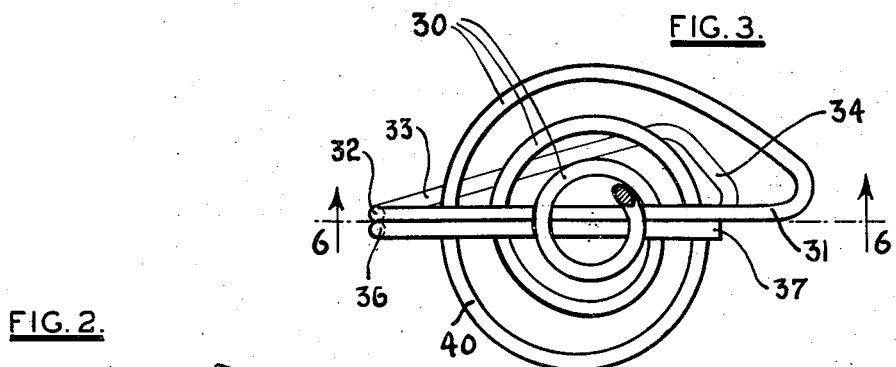
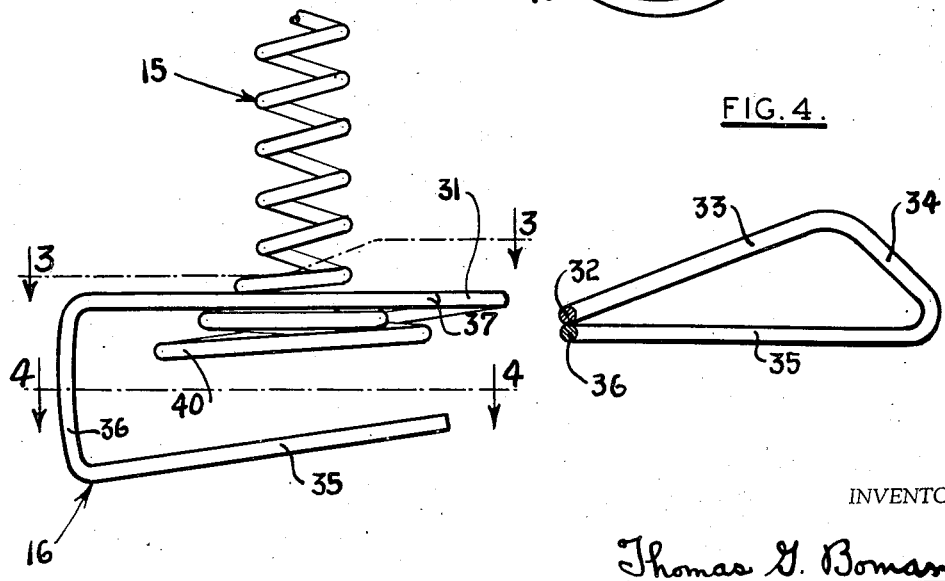
INVENTOR.
Thomas G. Boman.

May 4, 1943.  T. G. BOMAN  2,317,976
IRONING CORD HOLDER
Filed Dec. 18, 1941  2 Sheets-Sheet 2
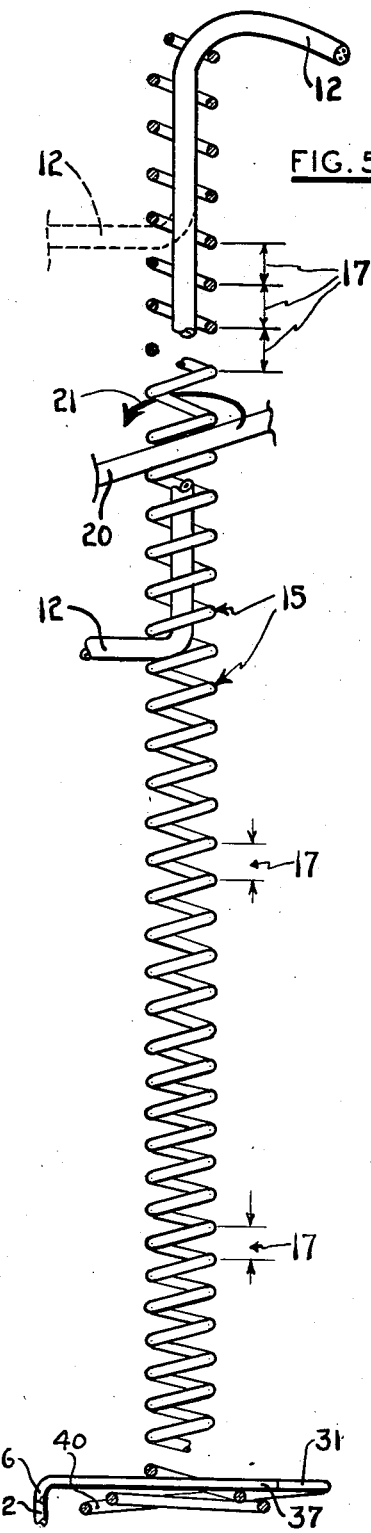
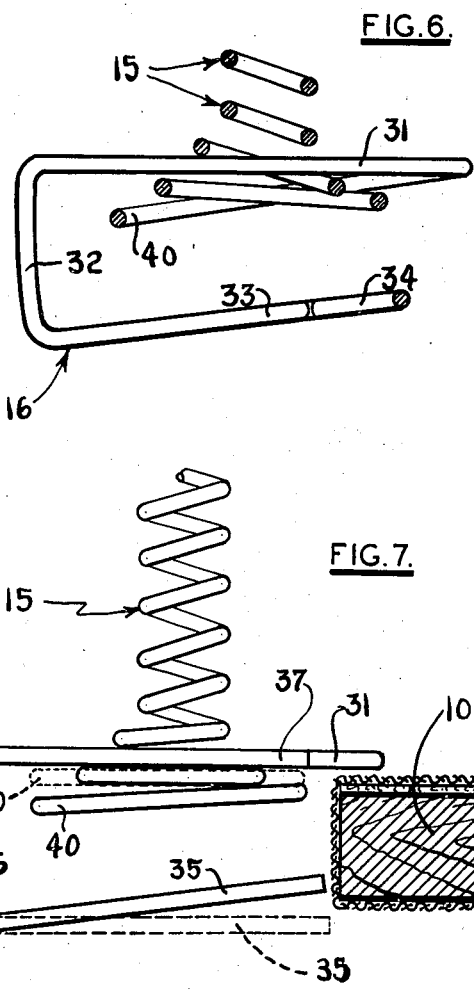
INVENTOR.
Thomas G. Boman Patented May 4, 1943

2,317,976

UNITED STATES PATENT OFFICE 2,317,976

IRONING CORD HOLDER

Thomas G. Boman, Grand Rapids, Mich.

Application December 18, 1941, Serial No. 423,511

2 Claims. (Cl. 248—51)

My invention relates generally to a support and housing and more particularly to a device which is adapted to be used to support an electrical conductor above a working surface in such a manner that an instrument connected thereto may be conveniently manipulated over the working surface without interference from the conductor.

And, the electrical conductor may be wound into and encased by the device whereby the conductor is protected and shielded.

In more simple terms, the flexible ironing cord gets in the operator's or user's way, sometimes mussing up the clothes already ironed, and other times catching underneath the corners of the ironing board, this latter action causing the cord to receive an abrupt jerk and bending action immediately adjacent the iron with consequent destruction of the cord. This is particularly detrimental to the copper conductor at this point as the heat from the iron causes excessive crystallization of the copper.

It is an object therefore of the present invention to provide a yielding support for flexible conductors which prevents damage to the conductors and which facilitates the operation of an instrument connected thereto.

As previously referred to, the electric cord may be encased and shielded by my construction whereby the hot sides or point of the iron cannot contact and thus injure the electrical cord.

Another feature of my invention lies in the full length coiling of the upright standard. This gives a plurality of advantages.

One is that this construction permits the flexible conductor to be lead out of the standard at any point below the top. In case a ceiling socket is used as the supplying fixture then the conductor might be threaded downwardly along the standard for only four or five turns. If the heater cord were to be plugged into a wall receptacle then the cord might be threaded to a middle point of the standard. Or, if a lower outlet box were contacted then the electrical conductor might be threaded completely through the flexible and bendable standard and housing.

Another advantage is that the standard, by having continuous coiling, does not bend about one point, in hinge fashion, but rather curves under strain at various points whereby a minimum of strain is had in the electrical conductor when it is extended to its greatest tautness, namely, when the iron is drawn to the extreme small end of the board.

The full length coiling also minimizes the degree of bending in a unit length whereby very long-lived operation is assured.

Another feature of my device is its circularly shaped base whereby the standard may be bent in any direction without affecting the stability of its base. And, the device may be slid onto the rear side of the board or onto the large end of the board with equal facility and efficiency. That is, the device may be applied to any desired portion of the board.

Another feature lies in the construction whereby the said circular base of the device, resting upon the top of the board, bears largely at the periphery of the said circular portion whereby return bending of the device, due to the return movement of the iron, does not cause a lessening of the stability of the base.

These and other objects I attain by the novel combination of various parts and elements fully described in this specification and illustrated in the accompanying drawings in which, Fig. 1 represents an illustration of a practical application of my novel bending and shielding device as applied to an ironing board.

Fig. 2 is an enlarged fragmentary view in side elevation of the lower portion of my device.

Fig. 3 is a sectional view taken along the line 3—3 of Fig. 2.

Fig. 4 is a sectional view taken along the line 4—4 of Fig. 2.

Fig. 5 is an enlarged fragmentary view of the upper portion of my device.

Fig. 6 is a sectional fragmentary view taken along the line 6—6 of Fig. 3.

Fig. 7 is a side view of the bottom part of my device showing its application to an ironing board.

Like numerals refer to like parts throughout the several views.

Referring to the drawings, numeral 10 indicates an ironing board carrying an electric iron 11 having current supplied thereto through the conductor cord 12. The cord 12 is bendable and flexible and is commonly called a heater cord.

The invention comprises a standard or stem, designated generally by numeral 15, see Fig. 1, and a base 16.

As is shown in Fig. 5, the stem comprises a wire coiled to the shape shown, the spacing of the coils being designated by numeral 17 and this dimension is approximately equal to or greater than the diameter of the conductor wire 12 whereby the conductor wire may be laid across and into any one of the loops as at 20, and then the higher end twisted around as indicated by the arrow 21 whereupon each revolution causes entry of the conductor into another coil of the stem and continued revolutions bring the conductor out of the top of the stem.

It will also be noted that the diameter of the stem, interiorly, is greater than the diameter of the conductor, this fact permitting easy movement of the conductor wire up or down whenever the same is grasped and pulled somewhat at either the top of the stem or at the point where the conductor leaves the stem. In other words, by somewhat straightening the bends at the points of entering and leaving the stem, the conductor may be slid up or down. This adjustment is made after the wire conductor has been threaded into the stem by wrapping it therearound and is necessary in order that the correct amount of conductor cord may be had between the iron and the top of the stem. The cord should be adjusted to that position where it will easily clear the board when the iron is immediately adjacent the base of the stem. Yet the cord must not be too short as this would prevent the iron from being pulled to the end of the board. It will be understood, of course, that the electric cord stays fixed and rigid within the stem 15 after it has been adjusted. No sliding occurs after adjustment as this would be bad electrical practice.

With respect to present practice, the usual ironing board being 54 inches long, the cord holder is made about 18 inches high and the length of the cord between the iron and the top of the stem, indicated by BC, should be about 30 inches. This length does not allow dragging of the cord at any time and yet permits the extreme end of the board to be reached expediently without causing bending of the holder or stem beyond approximately a 45° limit. And, by actual test, the wire being No. 11 gauge wound to about ½ inch inner diameter with ⅜ to ½ inch spacing of the coils, it has been found that only about 5 ounces are required to bend the stem to this position. Thus, it will be appreciated that the tautness of the cord is negligible and that consequently no appreciable wear will occur on the cord adjacent the iron.

Referring now to Figs. 2, 3 and 4, numeral 15, as previously mentioned, indicates the stem and the wire therein is continued downwardly slightly and outwardly as clearly shown in Figs. 2 and 3 to form the spiral 30. Next, the wire is extended at 31 across the top of the spiral, then bent downwardly at 32, then rearwardly at 33 somewhat in parallelism with the portion 31, then return bent at 34 and again across below the spiral at 35, see Fig. 4, then upwardly alongside of the portion 32 to form a similar portion 36, and then adjacent the portion 31 to form the terminal portion 37.

By the return bending of the wire sufficient strength is obtained to properly hold the device in position upon any ironing board. As will be understood by those skilled in this art, an ironing board may have one or more pads or the like thereon and consequently vary quite appreciably in thickness. This condition is taken care of by the outermost loop of wire, designated 40, of the spiral 30. As is clearly shown in Fig. 2, this part 40 extends downwardly and is yieldable to an upper position as indicated by the dotted lines of Fig. 7.

So that, see Fig. 7, when the board 10, carrying the various and divers pads and the like 9, is straddled by the lower and upper prongs of the base 16, the loop 40 may yield as far as necessary, as shown in the dotted lines of Fig. 7, to permit a connection onto the board and the pressure of the loop 40 will securely hold the device onto the board.

The device may be slid onto the rear edge of the board, away from the ironer, or onto the large end of the board, or, in fact, at practically any place on the board.

As is shown in Figs. 2 and 7, the lower prong of the base 16, this comprising portions 33, 34 and 35, is formed upwardly as shown so that its point or bight serves to snugly contact the underside of the board.

As will be seen from Figs. 2 and 7, the loop 40 provides a circular base of appreciable diameter which serves to form a stable support for the top side of the base against the ironing board. That is, see Fig. 3, from a point on the loop 40 immediately underneath the end of the terminal portion 37 around in a clockwise direction with respect to Fig. 3, to within a short distance of the beginning of cross wire 31, is the portion which contacts the board and this portion serves to form a circular ring, in effect, which gives a very desirable base as it makes for a tight and secure seat which prevents tilting of the device as regards the base and the board.

I am aware that numerous details of construction may be varied through a wide range without departing from the principles of this invention, and I therefore do not propose limiting the patent granted otherwise than necessitated by the prior art.

I claim:

1. An ironing cord holder of the class described comprising, a base portion adapted to be slid onto an ironing board, a stem attached to the base portion, said stem comprising a wire coiled to form an elongated stem, the coiling extending the full length of the stem, the inner diameter of the stem being constant and large enough to receive the usual heater cord and the spacing of the several loops of the coil being sufficient to permit entry of a heater cord therethrough at any point along their length.

2. An ironing cord holder comprising, a base portion adapted to be slid onto an ironing board, a stem attached to the base portion, said stem comprising a wire coiled to form an elongated stem, the coiling extending downwardly from the top of the stem for substantially the full length thereof, the inner diameter of the stem being large enough to receive the usual heater cord and the spacing of the several loops of the coil being close enough together to frictionally grip the heater cord when it is turned laterally from the inner diameter of the stem to pass between the said loops, thus preventing sliding movement of the cord through the stem.

THOMAS G. BOMAN.